(12) United States Patent
Carroll et al.

(10) Patent No.: US 11,282,135 B2
(45) Date of Patent: Mar. 22, 2022

(54) ONBOARDING QUASI-CUSTOMERS IN A DISASTER ZONE

(71) Applicant: Bank of America Corporation, Charlotte, NC (US)

(72) Inventors: Matthew E. Carroll, Charlotte, NC (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 142 days.

(21) Appl. No.: 16/191,753

(22) Filed: Nov. 15, 2018

(65) Prior Publication Data

US 2020/0160439 A1    May 21, 2020

(51) Int. Cl.
*G06Q 40/02* (2012.01)
*G06F 16/215* (2019.01)
*H04L 29/06* (2006.01)
*G06Q 50/00* (2012.01)

(52) U.S. Cl.
CPC .......... *G06Q 40/02* (2013.01); *G06F 16/215* (2019.01); *G06Q 50/01* (2013.01); *H04L 63/0876* (2013.01); *H04L 63/102* (2013.01)

(58) Field of Classification Search
CPC ...... G06Q 40/02; G06Q 50/01; G06F 16/215; H04L 63/0876; H04L 63/102
USPC .......................................................... 705/35
See application file for complete search history.

(56) References Cited

U.S. PATENT DOCUMENTS

| | | | |
|---|---|---|---|
| 8,306,914 B2 | 11/2012 | Johns et al. | |
| 8,341,080 B2 | 12/2012 | Johns et al. | |
| 8,548,911 B2 | 10/2013 | Dent et al. | |
| 8,793,190 B2 | 7/2014 | Johns et al. | |
| 9,406,055 B2 | 8/2016 | Grigg et al. | |
| 9,413,747 B2 | 8/2016 | Grigg et al. | |
| 9,582,830 B2 | 2/2017 | Johns et al. | |
| 9,830,648 B2 | 11/2017 | Kanjlia et al. | |
| 10,044,697 B2 | 8/2018 | Kim et al. | |
| 2012/0179601 A1* | 7/2012 | Johns .................. | G06Q 40/02 705/39 |

(Continued)

OTHER PUBLICATIONS

Dialog NPL (non-patent literature) Search, dated Dec. 31, 2021. (Year: 2021).*

(Continued)

*Primary Examiner* — Hai Tran
(74) *Attorney, Agent, or Firm* — Weiss & Arons LLP

(57) ABSTRACT

A method for securely launching a temporary financial system nested within a permanent financial system, for a locale impacted by a disaster event is provided. The method may include receiving profile-data associated with a new-quasi-user. The method may include storing the profile-data in an account profile. The method may further include analyzing the profile-data. The method may further include authenticating the new-quasi-user based on the analyzing of the profile-data. The method may further include enabling the new-quasi-user, access to a subset of services from the permanent financial system. The enabling may include simulating the temporary financial system to mimic the appearance of the permanent financial system. The method may further include filtering and separating, via a secure information filter, the temporary system from the permanent system thereby limiting the new-quasi-user, access to the permanent financial system.

17 Claims, 4 Drawing Sheets

(56) References Cited

U.S. PATENT DOCUMENTS

| | | | |
|---|---|---|---|
| 2013/0211859 A1* | 8/2013 | Dent | G06Q 40/02 |
| | | | 705/4 |
| 2015/0348182 A1* | 12/2015 | Cismas | G06Q 40/02 |
| | | | 705/35 |
| 2015/0379469 A1 | 12/2015 | Gordon et al. | |
| 2018/0144586 A1 | 5/2018 | Hartung et al. | |
| 2019/0171769 A1* | 6/2019 | Kurian | G06F 16/9038 |

OTHER PUBLICATIONS

American Banker, "Roadworthy: Wireless Format Encouraging Mobile Unit Use", Daniel Wolfe, New York, N.Y., Sep. 8, 2004. (Year: 2004).*

Google NPL (non-patent literature) Search, dated Dec. 31, 2021. (Year: 2021).*

* cited by examiner

| New-Quasi-User-Request | Analyze New-User | Confidence Level (0 - 10) | Temporary Financial System Display |
|---|---|---|---|
| RAPID AUTHENTICATION PROCESS | | | |
| Name: John<br>Location: A<br>Insert/Scan ID | Credit Score: 3<br>Assets: 2<br>Social Media: 2<br>Background Check: 3<br>Location: ✓ | 2 | Hello John<br>Credit & Loan Limit:<br>100　　　10K |
| Name: Joe<br>Location: B<br>Insert/Scan ID | Credit Score: 6<br>Assets: 8<br>Social Media: 7<br>Background Check: 8<br>Location: ✓ | 8 | Hello Joe<br>Credit & Loan Limit:<br>100　　　10K |
| Name: Doe<br>Location: C<br>Insert/Scan ID | Credit Score: 10<br>Assets: 10<br>Social Media: 10<br>Background Check: 10<br>Location: ✓ | 10 | Hello Doe<br>Credit & Loan Limit:<br>100　　　10K |
| Name: Mat<br>Location: D<br>Insert/Scan ID | Credit Score: 5<br>Assets: 5<br>Social Media: 6<br>Background Check: 6<br>Location: x | 0 | Hello Mat<br>Sorry,<br>Your location does not match the location of the disaster. |

FIG. 3

ONBOARDING QUASI-CUSTOMERS IN A DISASTER ZONE

FIELD OF TECHNOLOGY

Aspects of the invention relate to granting temporary financial access and financial services associated with a financial institution to non-users of the financial institution.

BACKGROUND OF THE DISCLOSURE

Financial institutions provide many services to both individuals, small entities and large entities. The services may include bank accounts, credit cards, auto loans, home loans, student loans, mortgages and many other financial services. In normal circumstances, a new customer may be required to supply the institution with one or more means of identification. The institution may further require the new customer to fill out and complete numerous forms and questionnaires prior to verifying and authenticating the customer. The financial institution may review the customer's credit history and other means of authentication in order to verify the customer. This may take one day and may take up to a couple weeks.

A new customer that requests a loan may further be required to provide documentation including bank statements and/or pay stubs to prove that the customer has the ability to pay back the loan. Documentation including bank statements and pay stubs may generally entail time to locate and compile together. The financial institution then compiles all the data supplied by the new customer and submits it through an extensive verification process to securely authenticate and engage the new customer as a client to the financial institution.

In certain circumstances when a disaster enters a regional area, individuals, as well as small and large entities may be in a situation where typical access to a financial institution may be cut-off. Such circumstances include a widespread calamity that severely impacts the accountholder's locale, impacting the accountholder as well as locale-based brick-and-mortar banks, among other locale-associated individuals and institutions impacted. Extreme environmental conditions (e.g., earthquakes, tsunamis, gale-force winds, blizzards, and flooding) and man-made disasters (e.g., devastating terrorist attacks and accidental catastrophes) may result in a banking customer having neither physical identity-authentication documentation nor functional locale-based banks at which to present identity-authentication information. Such widespread calamities may also severely impair infrastructure that would otherwise enable an accountholder to contact the bank via transportation means and/or via communication devices. Such impairment of infrastructure may drastically reduce or effectively eliminate access to banking channels. The customer may be cut off from banking services both inside and outside the locale of the calamity. Impairment of transportation infrastructure and/or of communications infrastructure in the wake of events such as regional disasters may be detrimental to the economy and welfare of persons and institutions of the locale. Such impairment of infrastructure within the region may also hamper coordination and implementation of disaster-relief efforts of community groups and of local governments and law-enforcement, and of larger-scale efforts such as those of the Federal Emergency Management Agency ("FEMA") and the Red Cross.

The financial institution that an individual or entity may be associated with may have been impacted by the disaster event and may be difficult to access or may in certain circumstances be inaccessible.

It would be desirable, therefore, to provide systems and methods to enable a financial institution the ability to provide temporary financial services to one or more individuals and entities that may not be a customer of the financial institution.

It would also be desirable to provide systems and methods to rapidly authenticate, temporarily, a new customer to the financial institution in the wake of a disaster. It would further be desirable to enable already existing customers of the financial institution, services and products at a lower-than-normal rate during a disaster event.

SUMMARY OF THE DISCLOSURE

Legacy financial systems are configured and programmed to securely maintain high sensitive data. Legacy financial systems use apparatus and methods for authentication of any potentially new customer prior to engaging them. These methods typically entail completion of forms and processes that are cumbersome and are lengthy in time. During a disaster event, these aforementioned methods may not be advantageous. When an emergency arises, the invention disclosed herewith may provide systems and methods that may enable quick authentication of a new customer requiring financial transactions and assistance without heightened security concerns. The systems and methods for providing financial assistance may assist residents in a location experiencing a disaster, while retaining integrity and security of the permanent financial institutions main integral systems.

Therefore, a method for securely launching a temporary financial system nested within a permanent financial system is provided. The temporary financial system may be launched in a locale impacted by a disaster event. The temporary financial system may be isolated, at least in part, from the permanent system. The isolation may be enabled via a secure information filter securely separating the temporary system from the permanent system. The method may be implemented on a computer processor.

The method may include receiving profile-data associated with a new-quasi-user. The new-quasi-user may be attempting to gain access to the temporary financial system. The profile-data may include an identification. The profile-data may also include a location of residency. The profile-data may be inputted by the new-quasi-user's residence within the temporary financial system.

In response to the receiving of the profile-data, the method may include storing the profile-data in an account profile for the new-quasi-user. The method may further include analyzing the profile-data. Based on the analysis, the method may include assigning a confidence level to the new-quasi-user based on the analysis of the public records and social media accounts.

The method may further include authenticating the new-quasi-user based on the analyzing of the profile-data. When the new-quasi-user is authenticated, the method may include enabling the new-quasi-user, access to the temporary financial system. The enabling may include and involve, simulating the temporary financial system to mimic the appearance of the permanent financial system.

Concurrently with the simulating, the method may also include filtering through the permanent financial system. The filtering may enable allowing access to a subset of available services from a set of available services within the permanent financial system. The filtering may be enabled to adjust, in real-time, the subset of available services. The subset of available services may be accessed via the temporary financial system while maintaining a secure blockage to the remaining set of services within the permanent financial system. The subset of available services may include customized financial support products. The customized products may include financial aid. The customized products may include small loans. The customized products may further include a discounted rate on disaster-relief products available within the permanent financial system.

The isolating may further include creating a quasi customer database. The quasi customer database may be a part of a database associated with the permanent financial system. In certain embodiments, the quasi customer database may be a separate database. The quasi customer database may be for storing and accessing the account profile and profile-data for the new-quasi-user of the temporary financial system.

The method may further include assigning a separate set of file retention rules for a one or more transaction-type files linked to each account profile. The separate set of file retention rules may be distinct from a set of permanent file retention rules. The file retention rules may be rules associated with the permanent financial system's database.

The separate set of file retention rules may include a sunset provision on the one or more transaction-type files. The sunset provision may be implemented for the entire account associated with the new-quasi-user. The sunset provision may be set for terminating the account profile for the new-quasi-user. The account(s) may be terminated after a pre-determined amount of time. The pre-determined time may be based on the time the local infrastructure may be repaired. It should be appreciated that the new-quasi-user's account may not be terminated in the event that the new-quasi-users requests to remain as a permanent user of the permanent financial system.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 shows an illustrative chart of a process in accordance with principles of the invention.

DETAILED DESCRIPTION OF THE DISCLOSURE

Figure 1:
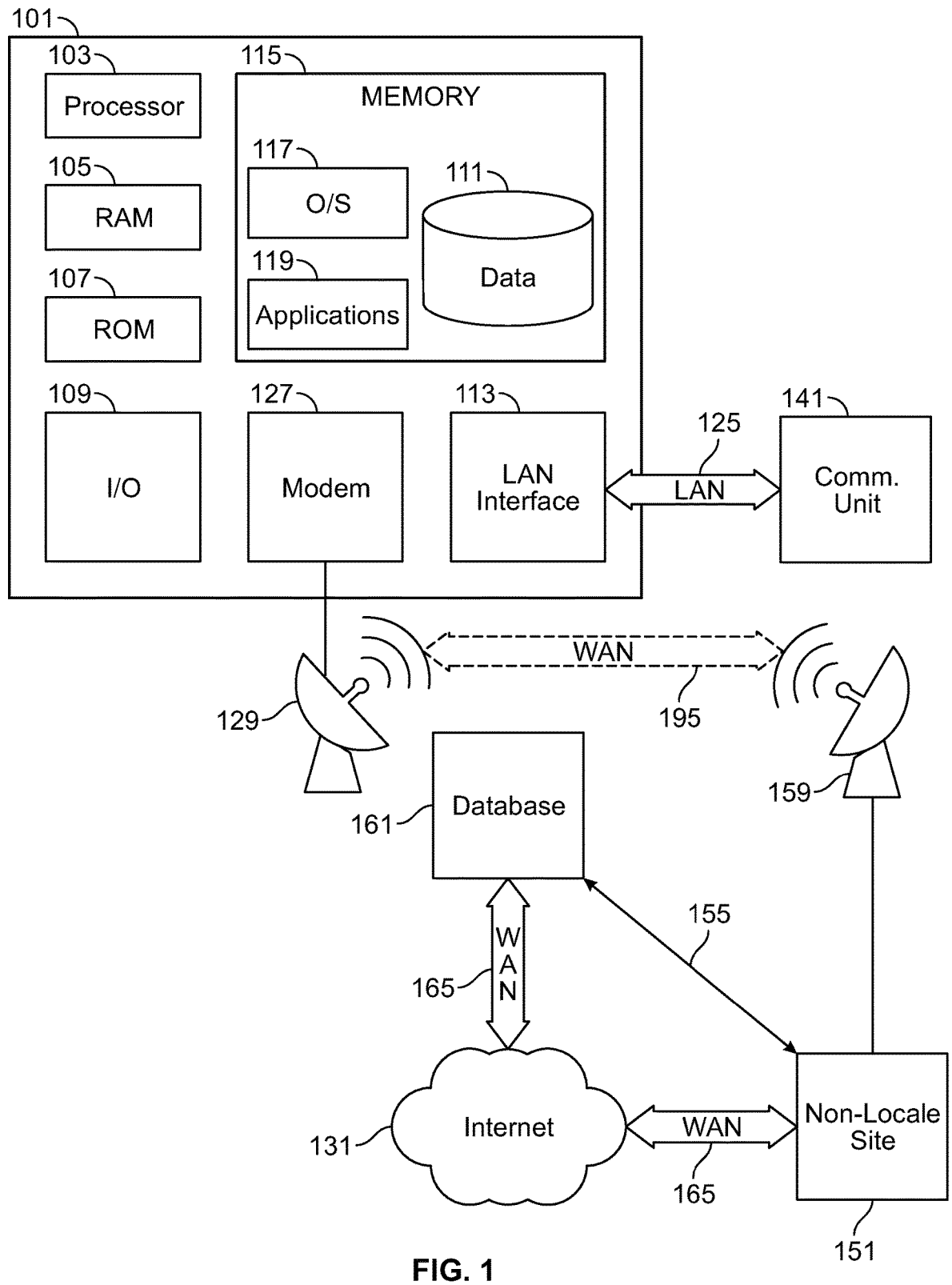
FIG. 1 shows an illustrative diagram in accordance with principles of the invention.

Systems and methods disclosed herein may provide financial services to non-users and already existing users of a financial institution. The financial services may be provided to residents of a location that may be impacted h a disaster event.

In one embodiment of the invention, a temporary financial architecture is provided. The temporary financial architecture may be launched for residents in a locale impacted by a disaster event that impairs locale infrastructure. The architecture may include a temporary electronic financial system. The architecture may also include a permanent electronic financial system.

The temporary financial system may simulate the permanent electronic financial system. The permanent financial system may be associated with a financial entity. The temporary financial system may be nested within the permanent financial system. The temporary financial system may be isolated, at least partially, from the permanent financial system. A secure information filter may reside between the temporary financial system and the permanent financial system. The secure information filter may be configured to securely separate the temporary system from the permanent system. The secure information filter may also, at least partially, isolate the temporary system from the permanent system. The isolating may enable limiting a new-quasi-user from accessing the permanent financial system.

The temporary financial system may include a rapid profile module. The rapid profile module may be configured to compile a user profile for the new-quasi-user of the temporary financial system. The user profile may include profile-data associated with the new-quasi-user. The basic profile may be received from the new-quasi-user. The basic profile may be stored in a repository within the temporary financial system.

The received profile-data may include an identification. The profile-data may include a place of location of residency.

The temporary financial system may also include a data analysis module. The data analysis module may be configured to, based on the data within the profile, analyze the profile-data. The analysis may be performed via the internet. The profile-data may be a minimal amount of data necessary to securely authenticate the new-quasi-user in a short amount of time.

The analysis may include accessing public records in order to verify the authenticity of the new-quasi-user. The public records may enable the system to view public documents that may assist in authenticating a new-quasi-user within a minimal amount of time. The analysis may also include viewing a credit history and credit score associated with the new-quasi-user. The credit score may assist in determining an amount of a loan that may be offered to the user. The credit score may assist in determining a credit limit offered to the user.

The analysis may further include accessing social media accounts associated with the new-quasi-user. The new-quasi-user may share social media account login information to the system in order to authenticate the new-quasi-user faster than standard authentication. It should be appreciated that analyzing social media accounts may enable the system access to a lot of information that may assist in verification within a quick turnaround time.

Accessing public records and social media accounts associated with the new-quasi-user may enable verification of the identification, location and to determine other background-related data associated with the new-quasi-user. The analysis may also include performing an online background-check on the new-quasi-user. The background-check may assist in providing a quick turnaround of any risk-factors that may be associated with the new-quasi-user. Risk-factors may affect the authentication of the new-quasi-user in a financial system.

Furthermore, the location of residency of the new-quasi-user may further be verified via a global positioning system ("GPS.") The location may also be verified via the user's mobile phone. It may be necessary to verify the location of residency in order to confirm that the disaster event directly affects the new-quasi-user. It should be appreciated that in the event that the location of the new-quasi-user is determined to be further than a pre-determined distance from the disaster event, the system may be configured to disable the new-quasi-user from accessing the temporary financial system's services.

The temporary financial system may further include a quick authentication module. The quick authentication module may be configured to authenticate the new-quasi-user based on the analysis. The analysis, via the public records and online background-checks, may determine credit scores, risks, assets and equity associated with the new-quasi-user. Based on the analysis, the new-quasi-user may gain or may not gain access to the temporary financial system during the disaster event. It should be appreciated that when the new-quasi-user is qualified to access the temporary financial system, there may be levels of access within the system.

The temporary financial system may include a subset of services that may be accessible to the new-quasi-user upon the launch of the temporary financial system. The subset of services may be a subset from a set of services available within the permanent financial system.

The temporary financial system may include, via the secure information filter, a disaster-services filter that may be configured to filter through the permanent system and allow access to the subset of available services via the temporary financial system while maintaining a secure blockage to the remaining set of services within the permanent financial system. The secure information filter may be enabled to adjust the number of services and the types of services, in real-time, for each new-quasi-user. The filter may add-in and/or may pull out some of services. The filtering may be based on the confidence level. The filtering may be based on AI.

The subset of available services may include customized financial support products. These customized products may be associated with transaction-types and products that may be helpful and/or necessary at the time of a disaster event. The customized products may include financial aid. The customized products may include small loans. The customized products may also include a discounted rate on disaster-relief products.

The subset of available services may also include providing a discounted rate for the new-quasi-user on one or more products that may be limited typically to existing users within the permanent financial system. The discounted rates may be at a rate that may lower the profit for the financial entity. The temporary system may run an algorithm that may be configured to extract any item that may be associated with disaster relief and may be further configured to reduce the cost of the items. These services may be a huge asset to the one or more new-quasi-users and at the same time may prompt the new-quasi-users a greater interest in transferring ultimately to a full-time user of the permanent system.

In certain embodiments, the isolating of the temporary financial system may further include limiting access to informational portions of the permanent electronic financial system and removal of access to execution portions of the permanent electronic financial system. This may enable a higher level of security for the permanent financial system from the one or more new-quasi-users.

The temporary financial system may further include a post-disaster customer cleanse module. The post-disaster customer cleanse module may be configured to, when the locale's infrastructure is repaired, delete the new-quasi-user from the temporary financial system.

The post-disaster customer cleanse module may be further configured to, for any pre-existing user of the permanent system, remove any overdraft charges that may have incurred during the disaster event.

The subset of available services may be available additionally for the pre-existing user of the permanent system. The temporary financial system may be further configured to trigger an account-profile-review of recent account activity of the pre-existing user within the permanent system and, based on the recent activity, and offer one or more services that may be associated with the recent existing user activity at a lower interest rate.

In certain embodiments, the temporary financial architecture may include a mobile banking platform using apparatus and methods described in U.S. patent application Ser. No. 13/369,534, filed on Feb. 9, 2012, now U.S. Pat. No. 8,548,911 both of which are hereby incorporated by reference herein in their entireties.

The mobile banking platform may include a mobile banking unit. The mobile banking unit may be configured to be activated for a location experiencing a disaster event and the local infrastructure may be impaired. The mobile banking unit may be a physical mobile unit that may be equipped to provide secure services for banking, data-handling and communications. The mobile banking unit may include other services typically available in an electronic financial environment. The mobile banking unit may be configured to offer these services when access to an electronic financial environment is cut off due to a power outage in the locale. The electronic financial environment may be inaccessible due to a loss of personal electronic devices during a disaster event.

The temporary financial system may include a post-disaster customer cleanse module. The post-disaster customer cleanse module may be activated after the infrastructure of the location where the disaster event took place is restored. The post-disaster customer cleanse module may be configured to, after a pre-determined amount of time, remove each new-quasi-user's profile from the temporary system. The removal may include removing and erasing account activity that may have been recorded during the time the temporary financial system may have been running.

The post-disaster customer cleanse module may be further configured to remove any one or more overdraft fees that may have been charged to any one or more new-quasi-users during the disaster event. The post-disaster customer cleanse module may be configured to remove any past-due fees that may have been charged to any one or more new-quasi-users during the disaster event. The charges may have occurred due to lack of typical access to financial institutions including brick and mortal financial institutions, online banking and/or automated teller machines ("ATM").

In certain embodiments, the temporary financial system may be launched for a plurality of new-quasi-users who may be residents in a locale impacted by a disaster event that impairs locale infrastructure. The temporary financial architecture may include a permanent financial electronic system. The temporary financial electronic system may simulate the permanent financial system associated with a financial entity. The temporary financial system may be nested within the permanent financial system. The temporary financial system may be isolated, at least partially from, the permanent financial system.

The temporary financial system may include a rapid-build profile module. The rapid-build profile module may be configured to compile a user-profile for each of the plurality of new-quasi-users of the temporary financial system. Each of the user-profiles may be based on profile-data associated with and received from each of the plurality of new-quasi-users. The plurality of user-profiles may be stored within the temporary system. The received profile-data for each of the plurality of new-quasi-user may include an identification, and a place of location of residency.

The temporary financial system may further include a data analysis module. The data analysis module may be configured to, based on the data within the profile, analyze the identification and the location. The location may be analyzed in comparison to the locale impacted by the disaster event.

The temporary financial system may further include a quick authentication module. The quick authentication module may be configured to authenticate each of the plurality of new-quasi-users based on the analysis.

The temporary financial system may provide a subset of services accessible to each of the plurality of new-quasi-users upon the launch of the temporary banking system. The subset of services may be from a set of services available within the permanent banking system. The subset of services may be individualized for each of the plurality of new-quasi-users.

The temporary financial system may further include a secure information filter. The secure information filter may securely separate, and at least partially isolate, the temporary system from the permanent system thereby limiting each of the plurality of new-quasi-users, access to the permanent financial system.

The temporary financial system may further include a post-disaster customer cleanse module configured to, when the locale's infrastructure is repaired, delete each of the user-profiles for each of the plurality of new-quasi-users stored within the temporary financial system.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 is a block diagram that illustrates a generic computing device 101 (alternatively referred to herein as a "computer" and/or "server") that may be used according to an illustrative embodiment of the invention. The computer server 101 may be resident on the mobile platform. The computer server 101 may have a processor 103 for controlling overall operation of the server and its associated components, including RAM 105, ROM 107, input/output ("I/O") module 109, and memory 115.

I/O module 109 may include a microphone, keypad, touch screen, fingerprint reader, biometric scanner, camera and/or stylus through which a user of device 101 may provide input, and may also include one or more of a speaker for providing audio output and a video display device for providing textual, audiovisual and/or graphical output. Software may be stored within memory 115 and/or storage (not shown) to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown).

Application programs 119 used by server 101 may contain, according to an illustrative embodiment of the invention, computer executable instructions for supporting disaster-relief functions.

Database 111 used by server 101 may provide, according to an illustrative embodiment of the invention, centralized storage of the informational data comprising the registry, facilitating interoperability of varied disaster-relief functions between different elements of the entity residing at different physical locations.

Server 101 may operate in a networked environment supporting connections to one or more remote elements, such as communication unit ("Comm. Unit") 141 and non-locale site 151. Remote elements 141 and 151 may include personal computers or servers that comprise many or all of the elements described above relative to server 101. The network connections depicted in FIG. 1 include a local area network (LAN) 125, wide area network (WAN) 165 and WAN 195, but may also include other networks. When used in a LAN networking environment, computer 101 may be connected to LAN 125 through a network interface or adapter 113. When used in a WAN networking environment, server 101 may include a modem 127 and/or other means for establishing communications (such as through satellite dish 129) over WAN 195. WAN 195 may allow communication between server 101 and non-locale site 151 (such as through satellite dish 159). Non-locale site 151 may communicate with database 161 through communication link 155. Non-locale site 151 may communicate with database 161 through WAN 165 and/or other means for establishing communications over WAN 165, such as Internet 131. Internet 131 may be available to server 101 through the networked environment. It will be appreciated that the network connections shown are illustrative and other means of establishing a communications link between the computers may be used. The existence of any of various well-known protocols such as TCP/IP, Ethernet, FTP, HTTP and the like is presumed, and that operations may be carried out in a client-server configuration to permit a user to retrieve web pages from a web-based server. Any of various conventional web browsers may be used to display and manipulate data on web pages.

Additionally, application programs 119 used by server 101, according to an illustrative embodiment of the invention, may include computer executable instructions for invoking user functionality related to communication, such as email, short message service (SMS), and voice input and speech recognition applications.

Computing device 101 and/or remote elements 141 or 151 may also be mobile terminals including various other components, such as a battery, speaker, and antennas (not shown).

Server 101, according to an illustrative embodiment of the invention, may implement disaster-relief functions as a process or set of processes within server 101 and/or distributed over one or more remote network-linked computers, such as may be included in remote elements 141 and 151.

Figure 2:
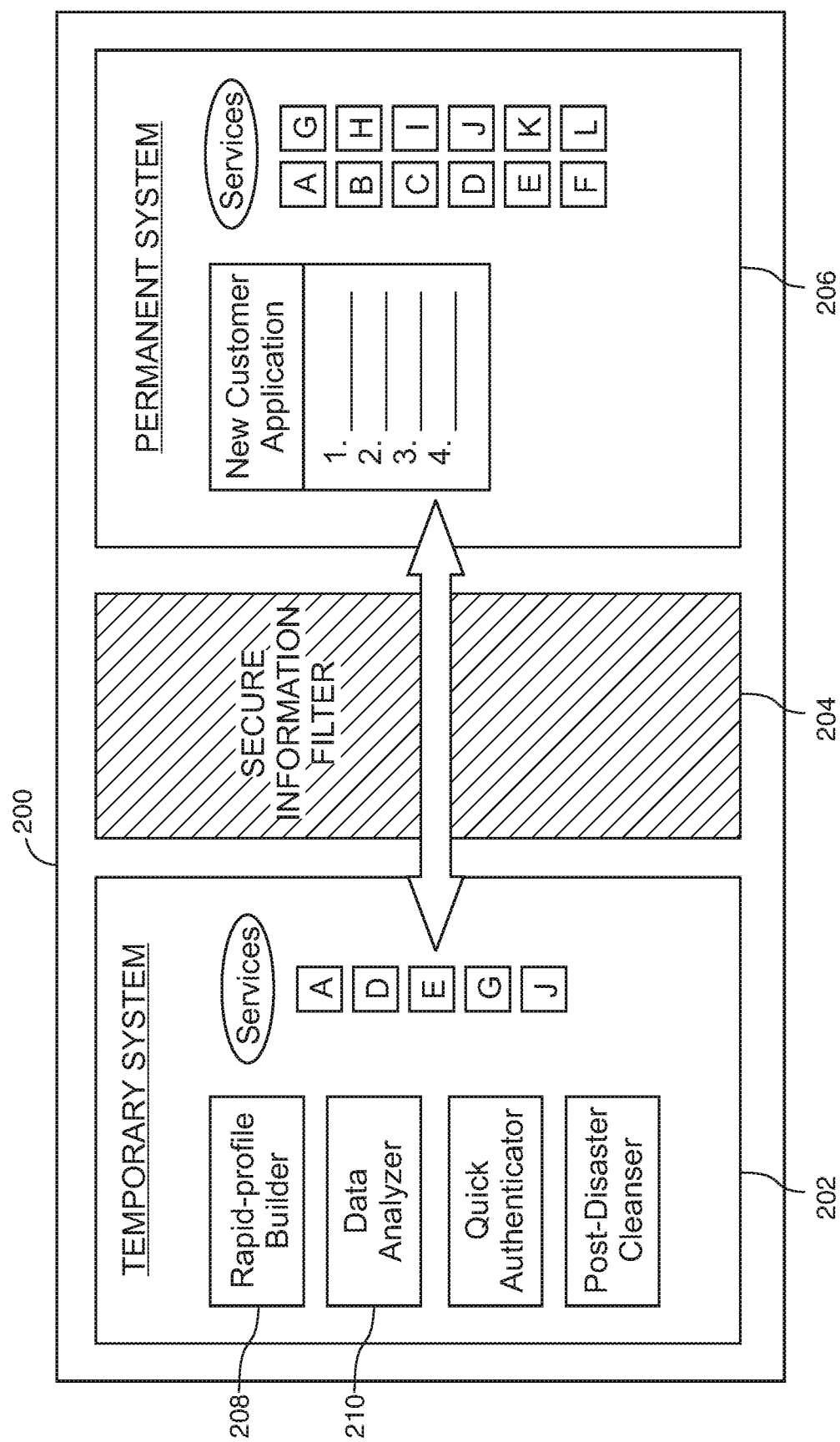
FIG. 2 shows an illustrative block diagram of functional modules that may be used in accordance with principles of the invention.

FIG. 2 shows an illustrative financial architecture 200. Architecture 200 may display a financial system launched during a disaster event for providing disaster-relief services and functions in accordance with the principles of the invention. Architecture 200 including elements 202, 204 and 206 and the functions and modules within the elements 202, 204 and 206 may comprise several functional modules. Architecture 200 and its functional modules may correspond in whole or in part to devices, components and elements shown in FIG. 1. Functional modules within architecture 200 may be associated with each other in the course of providing temporary disaster-relief services and functions, sharing in and overlapping functional operations.

Financial architecture 200 may include a temporary financial system 202. Financial architecture 200 may include a permanent financial system 206. The temporary system 202 may be nested within the permanent system 206. The architecture 200 may include a secure-information filter 204 residing between the temporary system 202 and the permanent system 206. The secure information filter 204 may link one or more services available within the permanent system 206 to the temporary system 202. Secure information filter 204 may be linked to artificial intelligence ("AI") and may adjust the availability of services being made available in the temporary financial system from the permanent system. The linking may be limited. Simultaneous to the linking, filter 204 may isolate the rest of the services available within the permanent system from accessing via the temporary system. In certain embodiments, the isolating may be adjusted and may filter in and out different subsets of services.

Temporary system 202 may include data displayed on a screen via a graphical user interface ("GUI".) The GUI may enable users access to the system. The GUI may be displayed on a mobile device. The GUI may be displayed on a laptop. The GUI may be displayed and accessed via an automated teller machine ("ATM.")

Temporary system 202 may include rapid-build profile module 208. Rapid-build profile module 208 may be configured to receive profile-data associated with one or more users attempting to become new-quasi-users of the temporary system 202.

Temporary system 202 may also include data analysis module 210. Data analysis module 210 may be configured to analyze the data received at module 208 and may perform an analysis check.

FIG. 3 shows an illustrative diagram of an exemplary rapid authentication process 300 in accordance with principles of the invention. The rapid authentication process may be activated for one or more residents of a location experiencing a disaster. A plurality of new-quasi-users may be attempting to access the temporary financial system 200. The new-quasi-users may be accessing the temporary system via a mobile device. The new-quasi-users, in certain embodiments, may be accessing the temporary financial system via a mobile banking unit. The mobile banking unit may be necessary when one or more residents may lost power and may not have network connection, server connection, and/or internet connection. The rapid authentication process 300 may be a process that may be performed within a couple of seconds to a few short minutes.

In this exemplary process 300, there are four new-quasi-users being authenticated. The new-quasi-users that may necessitate the banking disaster-relief services may be a locale-associated resident/citizen, banking customer, entity-account holder or any other suitable client.

Column 302 may be displayed on a screen to the user. Column 302 may be the front-end of a user attempting to access the temporary financial system. The display may be displayed on a graphical user interface ("GUI") of a mobile device, ATM, mobile banking unit, and/or any other means of connection to the financial institution. At column 302, a name, location of residence and a form of identification may be submitted. Column 304 may be the analysis performed based on the data entered at column 302. The analysis may not be displayed and may be performed on the back-end of the system. The analysis may be based on public records, credit reports, background checks and social media. There may be an algorithm performed based on the analysis. The analysis may determine a level of trust of the user and a financial level of the user based on the searches performed using the public records, social media and other online methods of user validation.

The algorithm may further assign a score for each of the data elements including user's credit score, assets, social media and background-check, based on the analysis. The algorithm may further perform a function based on the location inputted by the user whether the user is within a pre-determined proximity to the location of the disaster event. In the event that the user's location is a further distance than a pre-determined proximity, the user may not be authenticated and may not gain access to the temporary financial system. This may assist in excluding individuals that attempt to take advantage of disorder within the location that may be experiencing the disaster.

At column 306, the algorithm may further perform, on the back-end, one or more calculations. The calculations may be based on the scores assigned to each data element. The calculation may determine and assign a confidence level for the new-quasi-user. The confidence level may be a number from 0 to 10. When the location entered by the user is not within proximity to the disaster event, the user may be automatically assigned a "0" and may not gain access to the temporary system.

Column 308 may be displayed to the user on a GUI. The GUI may display the home-page of the temporary financial system. The display screen may further display a credit limit and a loan limit of the new-quasi-user that may be authenticated. The credit and loan limit may be based on the confidence level assigned to the new-quasi-user. It should be appreciated that the system may use artificial intelligence ("AI") for accuracy. When a score assigned to the user based on the social media and public records search is not correct, AI may be enabled to determine the reason for inaccuracy and may adjust the algorithm based on the searches and the data to gain an accurate confidence level. For example, a bankruptcy lawyer may be attempting to access the temporary financial system. Based on the analysis of public records and social media of a specific new-quasi-user, the word "bankruptcy" may be pulled numerous times from the user's records and the algorithm may return and assign a low-score to the new-quasi-user based on the term "bankruptcy." AI may reconstruct the algorithm to correctly verify and assign an appropriate confidence level to a user in subsequent authentications.

Within the GUI in column 308, specific services may be available and displayed to the user. The services available may be based on the confidence level assigned to the user.

At row 310, a new-quasi-user, John, may be attempting authentication for the temporary financial system. John may enter his name, location of residence and insert a form of identification. The form of identification may include information contained in client-borne documentation such as a driver's license. The identification information received by the user may include an item of user-knowledge (e.g., a Social Security number). The identification information received by the user may include biometric information pertaining to the client (e.g., a fingerprint, a voiceprint). The identification information received by the receiver may include the client's name, address, photograph, biometric data and/or any other suitable identifying information. When the user is an already existing user of the permanent financial system, the identification information received by the user may include bank-relevant information (e.g., an account number, a PIN, an answer to a bank security question).

The data entered at column 302/row 310, may be processed and submitted for analysis. The scores assigned to each entry in column 304/row 310 may not be visible to the new-quasi-user. This may be performed on the back-end of the system. Upon completion of the analysis, based on the algorithms performed, a confidence level of '2' may be assigned to new-quasi-user "John." At this point, the display screen may now display to the user within the temporary financial system, a maximum credit and loan limit available to the new-quasi-user. John may be given a lower limit based on the low numbers determined within the analysis. It should be appreciated that based on the confidence level, each user may be able to access a different set of financial services. The financial services may be available within the temporary financial system but may be linked to the permanent financial system via a secure information filter.

At column 302/row 312, new-quasi-user "Joe" may be attempting authentication within the temporary financial system. Joe may input his name, location and form of identification to the display screen. Upon submission, an analysis at column 304/row 312 may be performed and scores may be assigned based on the algorithm performed. At column 306/row 312 a confidence level may be assigned to new-quasi-user "Joe." Column 308/row 312 may display to "Joe" his available credit and loan limit based on the confidence level. At column 302/row 314 new-quasi-user "Doe" may be attempting accessing the temporary financial system. "Doe" may enter his name, location and submit a form of identification within the display screen. At column 304/row 314, the data entered may be analyzed and scores may be assigned based on the algorithms performed. At column 306/row 314, a confidence level may be assigned to user "Doe." Column 308/row 314 may display to new-quasi-user "Doe" his maximum credit and loan limit available.

At column 302/row 316, new-quasi-user "Mat" may be attempting accessing the temporary financial system. "Mat" may input his name, location of residence and form of identification. At column 304/row 316, the analysis process may be performed. The process may analyze public records, social media and other records to determine a score of each of the credit score, assets, social media, background check and location. An algorithm may be performed and the score may be assigned to each element. The algorithm may then calculate and combine the scores to create a confidence level, at column 306/row 316, for the new-quasi-user "Mat." Since Mat's location may be determined to be outside of the proximity of the location of the disaster event, Mat may receive a confidence level of '0,' and may be denied access to the temporary financial system, as shown at column 308/row 316.

Figure 4:
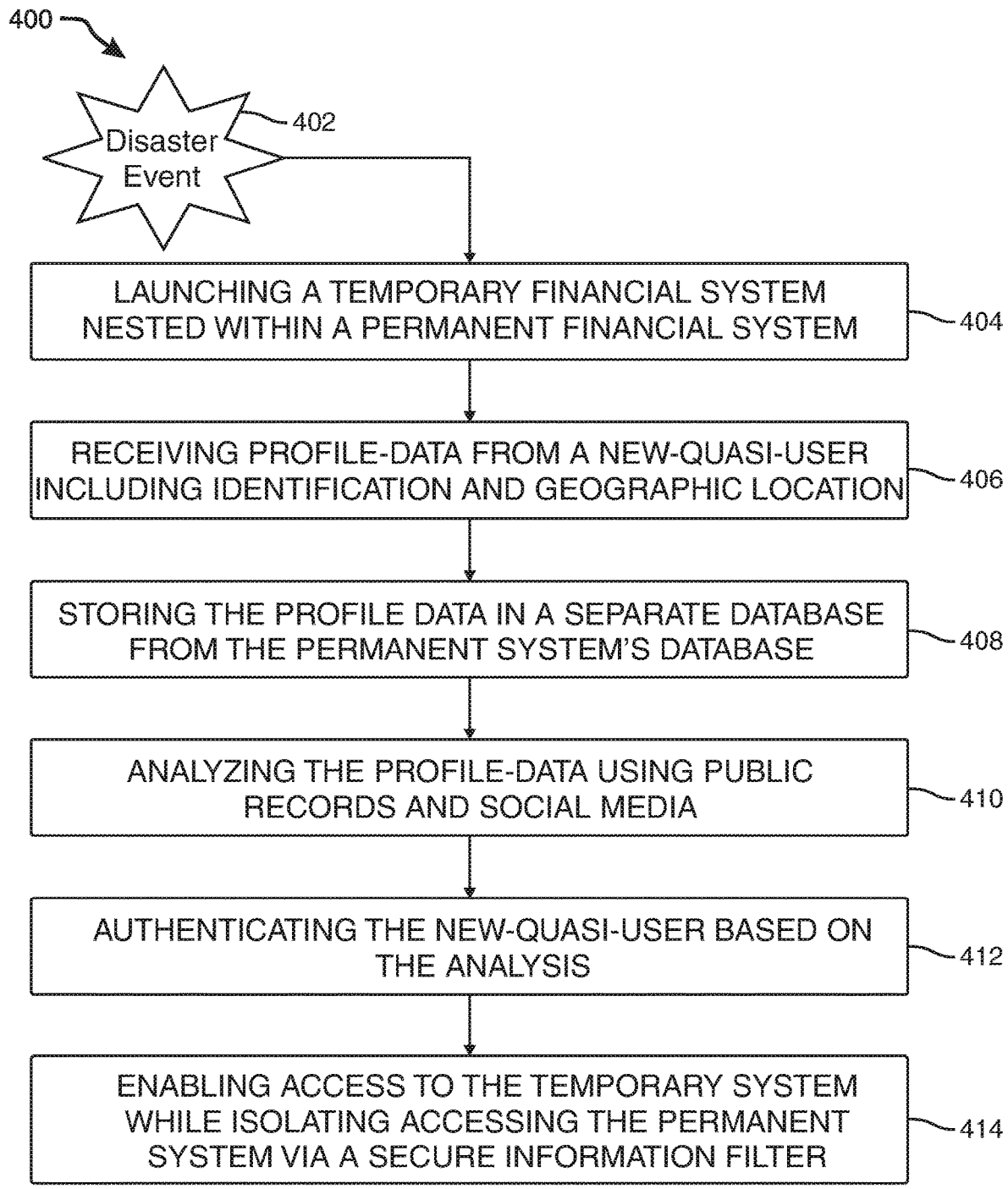
FIG. 4 shows an illustrative flow diagram of a process in accordance with principles of the invention.

FIG. 4 shows an illustrative process 400. Process 400 may be for providing disaster-relief services in response to a disaster event 402 in accordance with the principles of the invention. The disaster-relief services may be provided within a temporary financial system. The temporary financial system may be accessible to new-users. The temporary financial system may be accessible to already existing users of the permanent system.

At step 404 a temporary financial system may be launched. The temporary financial system may be nested within the permanent financial system. At step 406 profile-data may be received from a new-quasi-user. The new-quasi-user may provide a form(s) of personal identification. The new-quasi-user may provide a place of location of residency.

At step 408, the profile-data may be stored in a database of the temporary system. The database may be separate from the permanent financial systems database. At step 410, the profile-data may be analyzed in order to authenticate the new-quasi-user. The analyzing may be done using the searching of public records, social media and other forms of rapid searches that may be accessed via the internet.

At step 412, based on the analysis of within step 408, the new-quasi-user may be authenticated. At step 414, the new-quasi-user may be enabled to access the temporary financial system. The accessing may be limited to a subset of services from the services provided within the permanent financial system. The accessing may be limited via a secure information filter and the filter may isolate the temporary system from the permanent system. The secure information filter may be configured to adjust the level and/or number of services for each of the plurality of new-quasi-users. The secure information filter may be, based on AI, increase or decrease the services throughout the entire time the temporary financial system may be available.

Thus, methods and apparatus for launching a temporary financial system nested within a permanent financial system for non-users of the permanent system have been provided. Persons skilled in the art will appreciate that the present invention can be practiced by other than the described embodiments, which are presented for purposes of illustration rather than of limitation. The present invention is limited only by the claims that follow.

What is claimed is:

1. A temporary financial architecture launched for residents in a locale impacted by a disaster event that impairs locale infrastructure, the temporary financial architecture comprising:
　a permanent financial electronic system stored on a computer server; and
　a temporary financial electronic system stored on a computer memory of the computer server, the temporary financial system simulating the permanent financial system associated with a financial entity, the temporary financial system being nested within the permanent financial system and isolated, at least partially from, the permanent financial system by a secure information filter;
　a mobile automated teller machine ("ATM") associated with the financial entity, the temporary financial system and the permanent financial system running on the mobile ATM, the mobile ATM configured to be activated in the locale in response to determining that the mobile ATM is located within the locale of the disaster event, the mobile ATM equipped, to provide secure services for performing transactions, data-handling and communications;
　the temporary financial system running on the mobile ATM comprising:
　　a rapid-build profile module configured to, using a computer processor running on the computer server:
　　　receive, from a new-quasi-user, profile-data comprising a user identification and a place of residency;
　　　compile a user-profile for the new-quasi-user of the temporary financial system based on the received profile-data, the user-profile being stored within the computer memory; and
　　　store the user-profile within the computer memory;
　　a data analysis module configured to, based on the data within the user-profile, analyze, using the computer processor:
　　　the identification; and the location, in comparison to the locale impacted by the disaster event;

the analysis of the location of the new-quasi-user comprises analysis via one or more of social media, a global positioning system ("GPS") and a mobile phone;

the analysis of the location triggering denial of electronic access to the temporary financial system in the event that the location of the new-quasi-user is determined to be further than a predetermined distance from the disaster event;

a quick authentication module configured to authenticate, using the computer processor, the new-quasi-user based on the analysis;

a temporary financial electronic system for making available to the new quasi-user, in the event that the location is within a pre-determined proximity to the locale, a subset of services within the temporary financial system, the subset of services being selected from a set of services available within the permanent financial system, the subset of services being accessed via the temporary financial system while maintaining a secure blockage to the set of services within the per financial system, wherein each of the set of services and subset of services is an application program comprising computer executable instructions for executing disaster-relief functions;

the secure information filter for securely separating, and at least partially isolating, the temporary financial system from the permanent financial system, the at least partially isolating comprising:

limiting the electronic access to informational portions of the permanent electronic financial system and removal of electronic access to execution portions of the permanent electronic financial system thereby securing the permanent electronic financial system from the new-quasi-user;

creating a quasi customer database separate from a database associated with the permanent financial system, for storing and accessing the account profile of the new-quasi-user; and assigning a separate set of file retention rules associated with the quasi customer database, the separate set of file retention rules distinct from a set of permanent file retention rules associated with the database of the permanent financial system;

a post-disaster customer cleanse module configured to, after a pre-determined amount of time, and based off of the separate set of file retention rules:

delete the user-profile stored within the quasi customer database;

terminate an account profile associated with the user-profile; and deactivate the mobile ATM.

2. The architecture of claim 1, wherein the analysis of the profile-data via the data analysis module within the temporary financial system further comprises analyzing:

public records associated with the new-quasi-user; and historical data of social media accounts associated with the new-quasi-user.

3. The architecture of claim 2 Wherein the historical data is accessed via login information received from the new-quasi-user to the new-quasi-user's social media accounts.

4. The architecture of claim 1 wherein a confidence level is assigned to the new-quasi-user based on the analysis of the public records and social media accounts.

5. The architecture of claim 1 wherein the information security filter further comprises a disaster-services filter configured to filter through the permanent financial system and allow access to the subset of available services via the temporary financial system while maintaining a secure blockage to the remaining set of services within the permanent financial system.

6. The architecture of claim 5 wherein the subset of available services comprises customized financial support products, the customized products comprising, one or more of financial aid, small loans, and a discounted rate on disaster relief products.

7. The architecture of claim 5 wherein the subset of available services further comprises providing a discounted rate for the new-quasi-user on one or more products limited typically to existing users of the permanent financial system.

8. The architecture of claim 1 wherein the subset of available services is available additionally for a pre-existing user of the permanent system and the temporary system is further configured to trigger an account-profile-review of recent account activity of the pre-existing user within the permanent system and, based on the recent activity, offer one or more services at a lower interest rate.

9. The architecture of claim 1 wherein in response to the event that impairs local infrastructure, the system further comprises activating a mobile banking unit in the locale in response to the event, the mobile banking unit equipped to provide secure services for banking, data-handling and communications.

10. The architecture of claim 1 wherein the post-disaster customer cleanse module is further configured to, for the pre-existing user of the permanent system, remove one or more of an overdraft fee and a past-due fee that occurred during the disaster event.

11. A method for securely launching a temporary financial system nested within a permanent financial system, the temporary financial system and the permanent financial system running on a mobile automated teller machine ("ATM") for a locale impacted by a disaster event, the temporary financial system stored in computer memory, the temporary financial system isolated, at least in part, from the permanent financial system, the method comprising:

activating the mobile ATM in the locale in response to a determining that the mobile ATM is located within the locale of the disaster event, the mobile ATM equipped to provide secure services for performing transactions, data-handling and communications;

receiving a request at the mobile ATM from a new-quasi-user attempting to gain electronic access to the temporary financial system:

receiving profile-data associated with the new-quasi-user attempting to gain electronic access to the temporary financial system, the profile-data comprising user identification and a place of location of the new-quasi-user's residence;

analyzing the location of the new-quasi-user comprises analysis via one or more of social media, a global positioning system ("GPS") and a mobile phone;

storing the profile-data in an account profile;

analyzing the profile-data;

authenticating the new-quasi-user based on the analyzing of the profile-data; and based on the location of the new-quasi-user, triggering denial of electronic access when the location received is outside a pre-determined proximity to the local and enabling user-access to the temporary financial system only when the location received is within a pre-determined proximity to the locale, the enabling comprising:
simulating the temporary financial system to mimic the appearance of the permanent financial system; and
separating, and at least partially isolating, via a secure information filter, the temporary system from the permanent financial system thereby limiting the new-quasi-user, access to the permanent financial system, wherein the at least partially isolating comprises:
limiting the electronic access to informational portions of the permanent electronic financial system and removing electronic access to execution portions of the permanent electronic financial system thereby securing the permanent electronic financial system from the new-quasi-user;
creating a quasi customer database separate from a database associated with the permanent financial system, for storing and accessing the account profile of the new-quasi-user; and
assigning a separate set of file retention rules associated with the quasi customer database, the separate set of file retention rules distinct from a set of permanent file retention rules associated with the database of the permanent financial system;
concurrent to the simulating and separating:
filtering through the permanent financial system; and
allowing accessing, via the temporary financial system, a subset of available services from a set of available services within the permanent financial system while maintaining a secure blockage to a remaining set of services within the permanent financial system, wherein each of the set of available services and subset of available services is an application program comprising computer executable instructions for executing disaster-relief functions; and
when the locale's infrastructure is repaired:
deleting the profile-data of the new-quasi-user from the quasi customer database of the temporary financial system;
terminating the account profile associated with the profile-data; and
in response to deleting the profile-data, deactivating, the mobile ATM.

12. The method of claim 11 further comprising, assigning a confidence level to the new-quasi-user based on the analysis of public records and social media accounts.

13. The method of claim 11 wherein the separate set of file retention rules comprises a sunset provision on the one or more transaction-type files thereby terminating account profiles including the transaction-type files associated with the profile after a pre-determined amount of time unless the new-quasi-user remains as a permanent user of the permanent financial system.

14. The method of claim 11 wherein the subset of available services comprises customized financial support products, the customized products comprising one or more of:
financial aid;
small loans; and
a discounted rate on disaster-relief products.

15. The method of claim 14 further comprising, enabling a different subset of available services for each of the one or more new-quasi-users, the different subset of services being based on the confidence level assigned to each of the one or more new-quasi-users.

16. A temporary financial architecture launched for residents in a locale impacted by a disaster event that impairs locale infrastructure, the temporary financial architecture comprising:
a permanent financial electronic system; and
a temporary financial electronic system, the temporary financial system stored in computer memory, the temporary financial system simulating the permanent financial system associated with an entity, the temporary financial system being nested within the permanent financial system and isolated, at least partially from, the permanent financial system by a secure information filter;
a mobile automated teller machine ("ATM") associated with the entity, the temporary financial system and the permanent financial system running on the mobile ATM, the mobile ATM configured to be activated in the locale in response to a determining that the mobile ATM is located within the locale of the disaster event, the mobile ATM equipped to provide secure services for performing transactions, data-handling and communications;
the temporary financial system running on the mobile ATM comprising:
a rapid-build profile module configured to:
receive, from each of a plurality of new-quasi-users of the temporary system, profile data comprising a user identification and a place of location of residency;
compile a user-profile for each of a plurality of new-quasi-users based on the profile-data; and
store, in an account profile of a quasi customer database the received profile-data, the quasi customer database separate from a database of the permanent financial system;
a data analysis module configured to, based on the data within the profile, analyze:
the identification; and
the location in comparison to the locale impacted by the disaster event, the analysis of the location of the new-quasi-user comprises analysis via one or more of social media, a global positioning system ("GPS") and a mobile phone, the analysis of the location triggering denial of electronic access to the temporary financial system in the event that the location of the new-quasi-user is determined to be further than a predetermined distance from the disaster event;
a quick authentication module configured to authenticate each of the plurality of new-quasi-users based on the analysis;
a temporary financial electronic system for making available to each of the plurality of new-quasi-users, in the event that the location is within a pre-determined proximity to the locale, a subset of services within the temporary financial system, the subset of services being accessed via the temporary financial system while maintaining a secure blockage to the set of services within the permanent financial system;
the secure information filter securely separating, and at least partially isolating, the temporary system from the permanent system, the at least partially isolating comprising:
limiting the electronic access to informational portions of the permanent electronic financial system and removal of electronic access to execution portions of the permanent electronic financial system thereby securing the permanent financial system from the new-quasi-user; and assigning a separate set of file retention rules associated with the quasi customer database, the separate set of file retention rules distinct from a set of permanent file retention rules associated with the database of the permanent financial system;

a post-disaster customer cleanse module configured to, when the locale's infrastructure is repaired:

delete the user-profile from computer memory within the quasi customer database, for each of the plurality of new-quasi-users stored within the temporary financial system;

terminate the account profile associated with the user-profile from the quasi customer database; and deactivate the entity mobile platform.

17. The architecture of claim 16 wherein the subset of services available is a different subset for each of the plurality of new-quasi-users, the different subset being based on a confidence level assigned to each of the plurality Of new-quasi-users.

* * * * *